US008811362B2

(12) United States Patent
Drugge et al.

(10) Patent No.: US 8,811,362 B2
(45) Date of Patent: Aug. 19, 2014

(54) MULTICARRIER RADIO RECEIVER AND METHOD FOR RECEIVING MULTIPLE CARRIERS

(75) Inventors: Oskar Drugge, Malmö (SE); Muhammad Kazmi, Bromma (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 238 days.

(21) Appl. No.: 13/381,000

(22) PCT Filed: Jul. 2, 2010

(86) PCT No.: PCT/EP2010/059474
§ 371 (c)(1),
(2), (4) Date: Dec. 27, 2011

(87) PCT Pub. No.: WO2011/000947
PCT Pub. Date: Jan. 6, 2011

(65) Prior Publication Data
US 2012/0106530 A1 May 3, 2012

Related U.S. Application Data (60) Provisional application No. 61/222,502, filed on Jul. 2, 2009.

(51) Int. Cl.
| | |
|---|---|
| *H04W 4/00* | (2009.01) |
| *H04B 1/7083* | (2011.01) |
| *H04B 1/7113* | (2011.01) |
| *H04L 27/26* | (2006.01) |
| *H04B 17/00* | (2006.01) |
| *H04L 25/03* | (2006.01) |
| *H04L 25/02* | (2006.01) |
| *H04L 5/00* | (2006.01) |

(52) U.S. Cl.
CPC .......... *H04L 25/0216* (2013.01); *H04B 1/7083* (2013.01); *H04B 2201/70702* (2013.01); *H04L 2025/03509* (2013.01); *H04B 1/7113* (2013.01); *H04L 27/2647* (2013.01); *H04L 2025/03414* (2013.01); *H04L 25/0226* (2013.01); *H04L 25/03866* (2013.01); *H04B 17/0047* (2013.01); *H04L 25/0204* (2013.01); *H04L 25/0228* (2013.01); *H04L 5/0048* (2013.01)
USPC .......................................................... 370/338

(58) Field of Classification Search
None
See application file for complete search history.

(56) References Cited

U.S. PATENT DOCUMENTS

| | | | | |
|---|---|---|---|---|
| 2007/0121552 | A1* | 5/2007 | Lindoff | 370/333 |
| 2008/0182580 | A1* | 7/2008 | Laroia et al. | 455/440 |
| 2009/0264142 | A1* | 10/2009 | Sankar et al. | 455/501 |
| 2009/0279498 | A1* | 11/2009 | Li et al. | 370/329 |

OTHER PUBLICATIONS

PCT International Preliminary Report on Patentability, mailed Jun. 20, 2011 for PCT International Application No. PCT/EP2010/059474, filed on Jul. 2, 2010.

(Continued)

*Primary Examiner* — Chi Pham
*Assistant Examiner* — Fahmida Chowdhury
(74) *Attorney, Agent, or Firm* — Myers Bigel Sibley & Sajovec, PA (57) ABSTRACT

A radio receiver receives multiple radio frequency (RF) carriers where each RF carrier corresponds to a logical entity or object used in multi-carrier communications called a cell. A receiving radio node receives signals on serving cells, including a serving cell on a primary carrier and a serving cell on a secondary carrier, and on neighboring cells, including a neighboring cell on the primary carrier and a neighboring cell on the secondary carrier. Initially, a power delay profile is calculated for each of the serving cells and the neighboring cells. An association is determined between at least one cell on the primary carrier and at least one cell on the secondary carrier based on the calculated power delay profiles. The association is then later used in performing interference cancellation in the radio node.

18 Claims, 9 Drawing Sheets

(56) References Cited

OTHER PUBLICATIONS

PCT International Search Report, mailed Oct. 29, 2010 for PCT International Application No. PCT/EP2010/059474, filed on Jul. 2, 2010.

Qualcomm Europe: "Searcher Impact to DC-HSDPA Type 3i UEs When SCH is Absent on Secondary Carrier," 3rd Generation Partnership Project (3GPP), Mobile Competence Centre, Los Angeles, CA, USA, Jun. 25, 2009, p. 1-5.

* cited by examiner

MULTICARRIER RADIO RECEIVER AND METHOD FOR RECEIVING MULTIPLE CARRIERS

CROSS REFERENCE TO RELATED APPLICATIONS

This application is a 35 U.S.C. §371 national stage application of PCT International Application No. PCT/EP2010/059474, filed on 2 Jul. 2010, which itself claims priority to U.S. Provisional Patent Application No. 61/222,502, filed 2 Jul. 2009, the disclosure and content of both of which are incorporated by reference herein in their entirety. The above-referenced PCT International Application was published in the English language as International Publication No. WO 2011/000947 A1 on 6 Jan. 2011.

TECHNICAL FIELD

The technical field relates to radio communications systems, and more particularly, to multi-carrier receivers.

BACKGROUND

In response to the increased need for higher bit rate and more efficient transmission of packet data over cellular networks, the Wideband Code Division Multiple Access (WCDMA) Third generation Partnership project (3GPP) Release 5 extended the WCDMA specification with the High Speed Downlink Packet Access (HSDPA), and Release 6 introduced Enhanced Dedicated Channel (E-DCH), often referred as Enhanced Uplink (EUL) or High Speed Uplink Packet Access (HSUPA). HSDPA and HSUPA together are called High Speed Packet Access (HSPA) which greatly improves the achievable bit rate over the air interface. 3GPP Release 7 introduced higher-order modulation and multiple input multiple output (MIMO) for HSDPA to further improve the achievable bit rate.

Similarly, a primary objective of a multi-carrier (MC) system is to achieve high data rate. A multi-carrier arrangement with frequency division duplex (FDD) can be described as a set of downlink carriers linked to a set of uplink carriers. The downlink carriers can be adjacent or non-adjacent in the frequency domain, and the same holds for the uplink carriers. Multi-carrier arrangements can also be used in time division duplex (TDD) systems. The component carriers in a multi-carrier system may also belong to different frequency bands. As one example, WCDMA/HSPA operating on multiple 5 MHz carrier frequencies is referred to as Multi-Carrier WCDMA or Multi-Carrier HSPA. In an Evolved Universal Mobile Telecommunications System Terrestrial Radio Access Network (E-UTRAN) system, multiple component carriers such as four 20 MHz carriers in the downlink and two 20 MHz in the uplink (for FDD) can be used to enhance the data rate. So a multi-carrier system uses more than one carrier in the downlink and/or the uplink. One of the multi-carriers is called the primary or anchor carrier and the remaining one(s) is (are) called secondary or supplementary carriers.

The anchor carrier contains all physical channels including all common control channels. The secondary carriers may or may not contain all physical channels; for instance, they may lack some of the common downlink control channels. The anchor carrier in the downlink and in the uplink (i.e., if there is more than one carrier in uplink) should support legacy operation based on a single carrier, which means the downlink anchor carrier should contain all common channels so that the legacy single-carrier User Equipments (UEs) are served. A multi-carrier UE also needs the anchor carrier to transmit all common control channels for acquisition of the frame timing, neighbor cell measurements, etc. Any single-carrier system can be evolved to a multi-carrier system to increase data rate. The future advancements of HSPA, E-UTRAN, and other systems will likely result in multiple carriers both in the uplink and the downlink, (e.g., 4 downlink carriers and 2 uplink carriers).

Different types of receivers exist. Some can receive multi-carrier transmissions—others cannot. Some receivers have interference cancellation capability—some do not. Even for those that do have interference cancellation capability, there are differences in those capabilities. For example, one type of receiver might be able to specifically cancel inter-cell interference, while another type of receiver cannot. The inter-cell interference is contributed by the signals transmitted from the neighboring cells.

Different types of inter-cell interference cancelling receivers exist. Some will attempt to explicitly estimate the characteristics of the radio propagation channel through which the interference is passing in order to characterize the interference as it is seen on the receiver end. Others attempt to directly characterize the interference as it is seen on the receiver end without any explicit estimation of the radio propagation channel.

For receivers that attempt to characterize the radio propagation channel through which the interference is passing, the channel responses of all (or at least the strongest) neighboring cells on all frequencies need to be estimated on a regular basis, e.g., once every slot/sub-frame (660 µs for a WCDMA system). This channel response processing requires significant computational resources.

SUMMARY

The present invention provides a method and an apparatus for receiving multiple radio frequency (RF) carriers as set out in the appended claims. A radio receiver receives multiple radio frequency (RF) carriers where each RF carrier corresponds to a logical entity or object used in multi-carrier communications called a cell. The receiving node receives signals on serving cells, including a serving cell on the primary carrier and a serving cell on the secondary carrier, and on neighbor cells, including one or several neighbor cell(s) on the primary carrier and one or several neighboring cell(s) on the secondary carrier. Initially, a power delay profile is calculated for each of the serving cells and neighboring cells. An association is determined between at least one cell on the primary carrier and at least one cell on the secondary carrier based on the calculated power delay profiles. The association is then later used in performing interference cancellation at the radio node.

Each cell is associated with a geographical location as well as a transmission of a signal over an RF carrier. The serving cell is associated with a serving geographical location or site, and the neighboring cells are associated with one or more neighboring geographical locations or sites different from the serving geographical location or site. The determined association used in performing interference cancellation is that the at least one cell on the primary carrier originates from a same geographical site as the at least one cell on the secondary carrier.

In one non-limiting example implementation, the association used in performing interference cancellation may be determined by correlating the initially calculated power delay profile for each cell on the primary carrier with the initially calculated power delay profile for each cell on the secondary carrier and by determining which correlations exceed a predetermined threshold. Associated cells are ones that have a correlation that exceeds the predetermined threshold. At a later time, a power delay profile is calculated for the at least one cell on the primary carrier. The association is then used as follows in performing interference cancellation at the radio node. The power delay profile calculated at the later time for the at least one cell on the primary carrier is used as the power delay profile for the associated at least one cell on the secondary carrier at the later time. As a result, the need to calculate the power delay profile at the later time for the associated at least one cell on the secondary carrier is eliminated.

The technology may be applied to receiving multiple cells and multiple secondary carriers, where signal transmissions associated with interfering cells are to be canceled by the interference cancellation. If multiple cells are associated with a transmission of a signal over the primary RF carrier and multiple cells are associated with a transmission of a signal over multiple secondary RF carriers, the technology performs the following tasks:

(a) initially calculating a power delay profile for each of the multiple cells on the primary RF carrier and for each of the multiple cells on the multiple secondary RF carriers, (b) determining associations between a cell on the primary RF carrier and multiple cells on the secondary RF carrier based on the initially calculated power delay profiles, (d) calculating a power delay profile at a later time for each of the multiple cells on the primary RF carrier, and (d) using the determined associations in performing interference cancellation at the radio node. The using task (d) includes using the power delay profile calculated at the later time for each cell on the primary RF carrier as the power delay profile for the associated multiple cells on the secondary RF carrier at the later time.

The associations between a cell on the primary RF carrier and multiple cells on the secondary RF carrier based on the initially calculated power delay profiles may, for example, be determined by correlating the initially calculated power delay profile for each cell on the primary RF carrier with the initially calculated power delay profile for each cell on the secondary RF carriers and by determining which correlation results exceed a predetermined threshold. Associated cells have a correlation result that exceeds the predetermined threshold. Alternatively, correlation results may be listed or otherwise ordered based on a magnitude of the correlation result and associations made based on the listing. If the listing or ordering changes, then tasks (a)-(d) may be repeated.

In a first non-limiting example embodiment for determining carrier power delay profiles (PDPs), the power delay profiles of cells on the primary and secondary RF carriers are determined based on a cell search or cell identification procedure, which is performed using a known set of synchronization sequences and pilot signals on each of the primary and secondary RF carriers, and a multi-path search procedure, which is performed using the known set of pilot signals on each of the primary and secondary RF carriers.

In a second non-limiting example embodiment for determining cell PDPs, the power delay profiles of cells on the primary RF carrier are determined based on a cell search or cell identification procedure and a multi-path search procedure. However, the power delay profiles of cells on the secondary RF carriers are determined based on a path search performed on transmissions associated with secondary cells, where these secondary cells have been listed in a neighbor cell list for the secondary RF carriers, and any information needed to perform multi-path search on the secondary cells in the neighbor cell list has been provided to the UE beforehand.

In a third non-limiting example embodiment for determining cell PDPs, the power delay profiles of cells on the secondary RF carriers are determined based on a path search performed on transmissions associated with secondary cells, where these secondary cells belong to a same scrambling code group as a scrambling code group used by cells on the primary RF carrier. In a fourth non-limiting example embodiment for determining cell PDPs, the synchronization sequences correspond to a primary synchronization channel (P-SCH) and secondary synchronization channel (S-SCH) and the pilot signal corresponds to a common pilot channel (CPICH) in a wideband code division multiple access (WCDMA), dual carrier-high speed downlink packet access (DC-HSDPA) communications system.

The radio node may be for example a mobile radio terminal in a wideband code division multiple access (WCDMA), dual carrier-high speed downlink packet access (DC-HSDPA) communications system. In one non-limiting example application to this kind of system, the interference cancellation may be performed by a type $3i$ receiver configuration in the mobile terminal.

DETAILED DESCRIPTION

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions.

The technology may be used in any type of cellular radio communications. For ease of description, the term mobile radio terminal encompasses any kind of radio communications terminal/device like user equipment (UE), PDAs, cell phones, laptops, etc. The technology described in this application may be used in any radio communications system where multiple carriers are supported at least in one direction. One non-limiting example is a WCDMA network which communicates with one or more user equipments (UEs) over a Uu air interface. Typically, one or more core networks communicate with radio network controllers (RNCs) in the WCDMA network over an Iu interface. A WCDMA radio access network (RAN) may also be called Universal Mobile Telecommunications System (UMTS) Terrestrial Radio Access Network (UTRAN). The WCDMA RAN handles all tasks that relate to radio access control such as radio resource management and handover control. The core network connects the access network to one or more external networks (PSTN, Internet, etc.). The user equipment is connected to one or more radio base stations (Node Bs) over the WCDMA air interface. One or more base stations are coupled to an RNC over an Iub interface, and RNCs communicate over an Iur interface.

Figure 1:
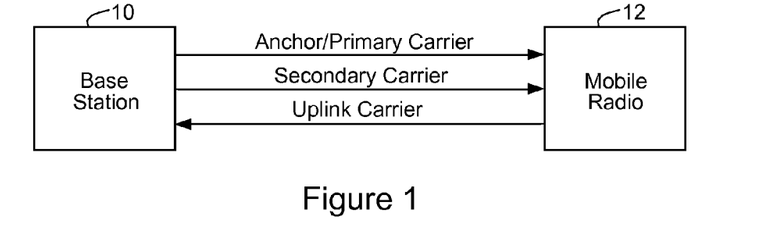
FIG. 1 illustrates an example multi-carrier communications system.

FIG. 1 illustrates an example multi-carrier communications system with a base station 10 communicating over an air interface with a mobile radio terminal 12 (a UE) using multiple carriers. In this example, the base station transmits an anchor or primary carrier and a secondary carrier, and the mobile radio 12 transmits a single uplink carrier. It should be understood that the mobile radio 12 is a multi-carrier radio in the sense that it can at least receive multiple carriers, but it also might be able to transmit using multiple carriers. While the examples below assume that the primary and secondary carriers are transmitted in the downlink from the base station 10 to the mobile radio 12, the technology also applies in the uplink direction for multi-carrier transmitting mobile radios, where the base station is the receiver and the mobile the transmitter.

In a non-limiting WDCMA example of FIG. 1, a UE in a dual cell-HSDPA (DC-HSDPA) operation, which is specified in 3GPP TS 25.214 release 8, is able to simultaneously receive HSDPA traffic over two downlink carrier frequencies transmitted in the same frequency band from a single serving base station sector. One uplink carrier for a DC-HSDPA UE is not tied to one of the two downlink carriers. In DC-HSDPA UE, the anchor carrier has all the physical channels including Forward Dedicated Physical Channel (F-DPCH), E-DCH HARQ Acknowledgement Indicator Channel (E-HICH), E-DCH Absolute Grant Channel (E-AGCH), and E-DCH Relative Grant Channel (E-RGCH). During dual carrier operation in CELL_DCH mode of operation, one of the downlink carriers is the secondary carrier and one is primary or anchor carrier.

Figure 2:
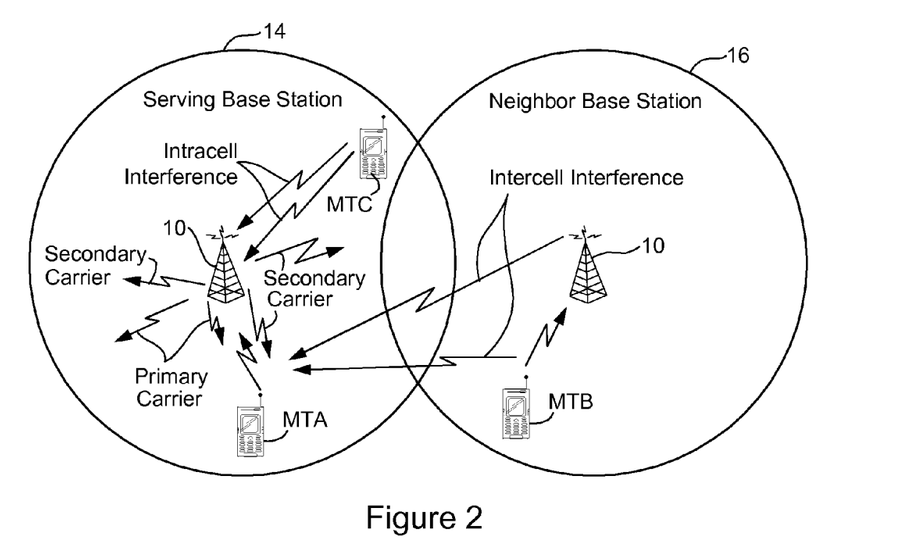
FIG. 2 illustrates an example multi-carrier cellular communications system showing intra-cell and inter-cell interference.

FIG. 2 illustrates an example multi-carrier cellular communications system showing intra-cell and inter-cell interference. The serving cell 14 includes a base station 10 that transmits to User equipments denoted mobile terminals MTA and MTC in its cell over primary and secondary carriers. A neighboring cell 16 also includes a base station 10 that transmits information which is received by mobile terminal MTB but which also may interfere with the radio communications in the serving cell 14—inter-cell interference. Transmissions from terminal MTB in the neighbor cell 16 may also be a source of inter-cell interference. Uplink transmissions from the mobile terminals in the serving cell 14 are a source of intra-cell interference.

Figure 3:
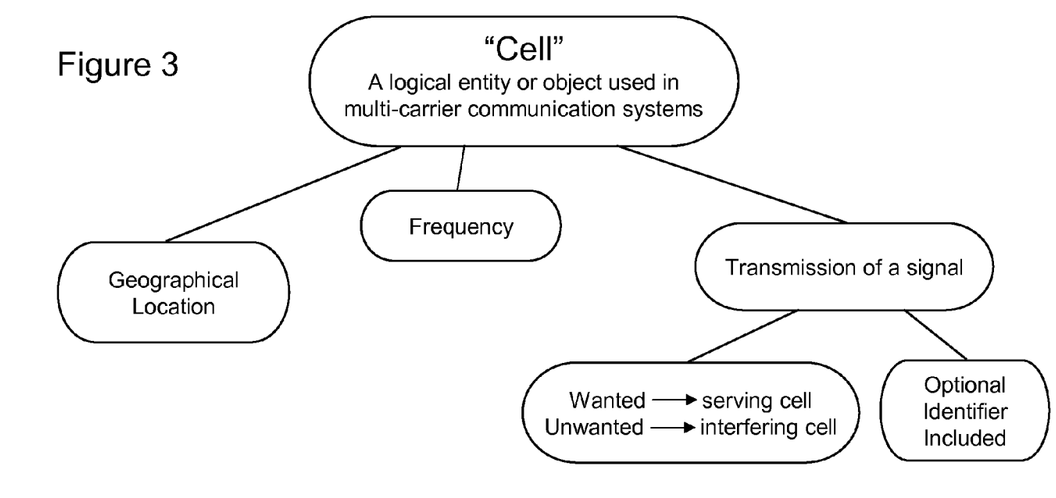
FIG. 3 is a diagram that illustrates characteristics of a cell in a multi-carrier communications system.

FIG. 3 is a diagram that illustrates characteristics of a cell in a multi-carrier communications system. A cell is a logical entity or object used in a multi-carrier communications system. A cell is associated with a geographical location such as a base station site, a frequency like an RF carrier frequency, and transmission of a signal over that RF carrier. Recall that an anchor or primary carrier frequency is the frequency which the radio terminal uses as a baseline connection to a base station and the network. The transmission from cells using the primary carrier frequency contains necessary common control information needed for the terminal to be able to operate in the network. Supplementary or secondary carrier frequencies include one or more carrier frequencies used by secondary cells transmitting additional information. Transmissions from cells using the secondary carrier frequencies do not necessarily contain all the common control channels needed for terminals to be able to operate in the network. The transmission of the signal may be "wanted" in the sense that it comes from a serving cell or "unwanted" in the sense it comes from a neighboring interfering cell.

The transmission may optionally include an identifier (e.g., an identification sequence) like a cell identifier. The transmission from cells using the primary carrier frequency is furthermore assumed to contain an identification sequence that enables the UE to identify the cells that are present on the primary carrier frequency. Transmissions from cells using the secondary frequencies may or may not contain an identification sequence that enables the terminal to identify the cells that are present on the supplementary carrier frequencies.

Figure 4:
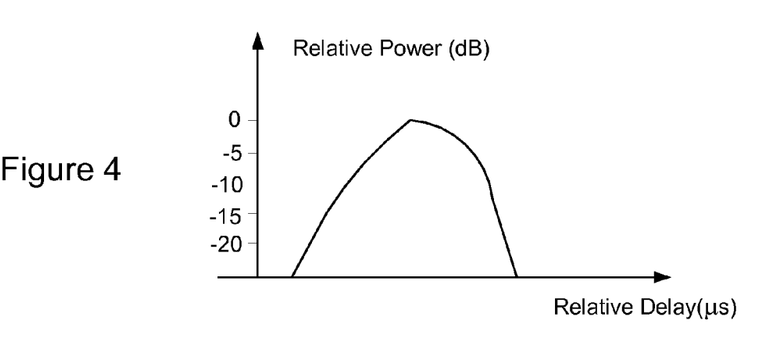
FIG. 4 illustrates an example power delay profile.

A power delay profile (PDP), which is essentially a characterization of a radio propagation channel, provides the intensity or level and phase of a signal received through a multipath channel as a function of time delay. The time delay is the difference in travel time between multipath arrivals at the receiver, e.g., radio terminal. An example of a power delay profile is shown in FIG. 4. As a brief summary to the problems identified above, recall that it is desirable for the radio receiver in a multi-carrier system to be able to effectively and efficiently in cancel interference from neighboring cells. But interference cancellation requires considerable processing resources due in part because of the need to calculate the power delay profile for each cell on the primary and secondary carriers that the radio receiver receives on a continuing basis.

Rather than perform these resource draining PDP operations for all cells on secondary carriers, the inventors discovered a shortcut process that can be used that eliminates the need for repeatedly calculating PDPs for cells on secondary carriers. Based on the recognition that power delay profiles on adjacent carriers in a DC-HSDPA cell (or in any downlink multi-carrier system) will be similar if transmitted from the same site, (e.g., base station, eNode B, etc.), the technology determines an association between cells belonging to the same site which eliminates the need to estimate the power delay profile independently for each cell on each secondary carrier.

Figure 5:
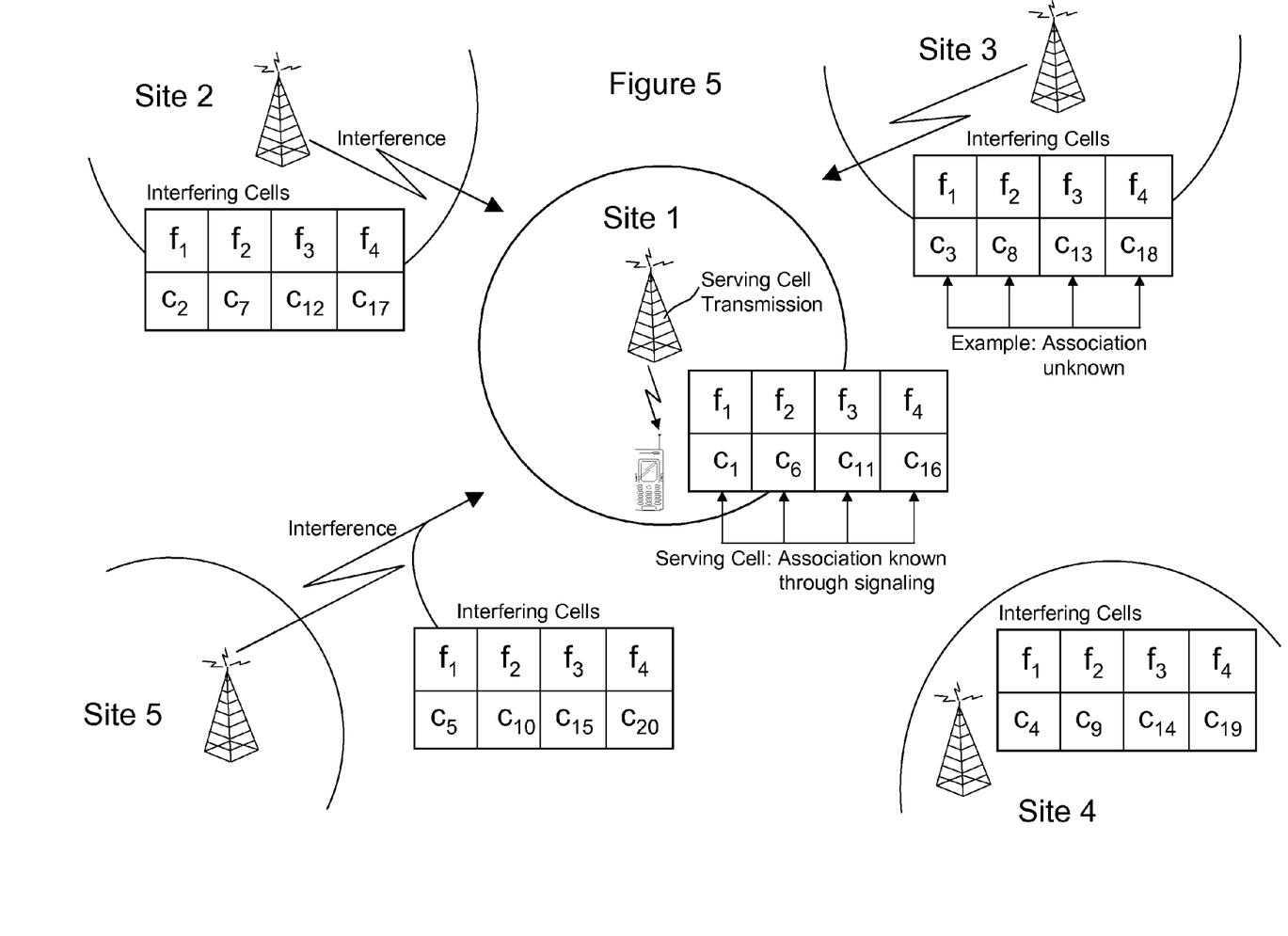
FIG. 5 illustrates a non-limiting example used to explain associations between carriers and cells at different geographical sites.

FIG. 5 illustrates a non-limiting example used to explain the concept of associations between carriers and cells at different geographical sites. There are five multi-carrier sites 1-5, with site 1 being the site serving the UE. Each of the sites includes a base station that transmits four RF carriers $f_1$-$f_4$, where $f_1$ is the primary carrier and $f_2$-$f_4$ are secondary carriers. The serving cell $c_1$ is on primary carrier $f_1$ and therefore serving cell $c_1$ is associated with a signal transmission over $f_1$. Serving cell $c_6$ is on secondary carrier $f_2$; serving cell $c_{11}$ is on secondary carrier $f_3$; and serving cell $c_{16}$ is on secondary carrier $f_{24}$. The UE knows about the associations between cell $c_6$ and $f_2$, cell $c_{11}$ and $f_3$, and cell $c_{16}$ and $f_{24}$ because information needed to receive them, such as for example scrambling code and master timing information, is either implicitly known or is included in the signal transmission the UE receives on primary carrier $f_1$.

The neighboring sites 2-5 include base station transmissions on the same carriers $f_1$-$f_4$, and therefore, are interfering with the cells in site 1. However, the UE in site 1 does not know what the associations are between carriers $f_1$-$f_4$ in each of sites 2-5 and the cells on those carriers in sites 2-5. This is indicated for example for site 3. The technology here allows the UE to determine what those unknown associations are and then use them to simplify the channel estimation/PDP calculation process and ultimately the interference cancellation process in the UE with respect to the interference caused by cell transmissions in sites 2-5.

Figure 6:
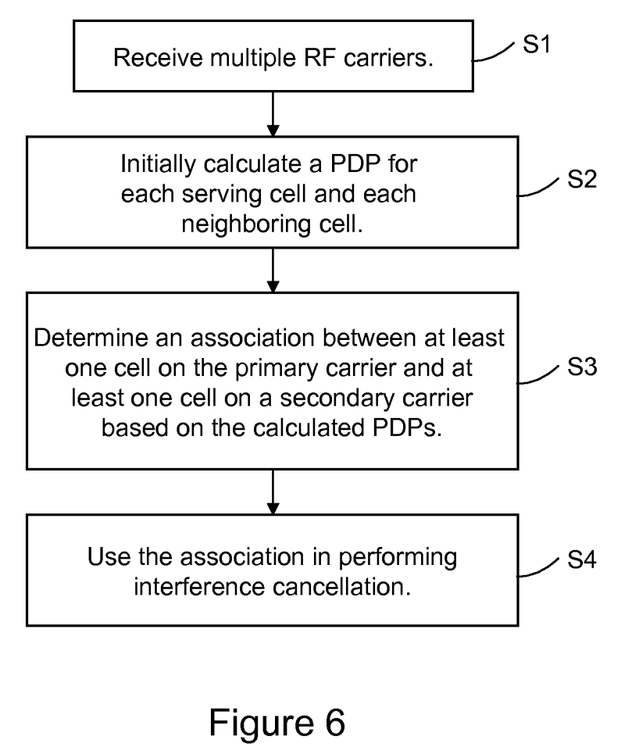
FIG. 6 is a flow chart illustrating non-limiting example procedures for determining an association between at least one cell on the primary carrier and at least one cell on the secondary carrier based on the calculated power delay profiles and using that association for interference cancellation.

FIG. 6 is a flow chart illustrating non-limiting example procedures for a radio receiver determining an association between at least one cell on the primary carrier and at least one cell on the secondary carrier based on the calculated power delay profiles and using that association for interference cancellation. The radio receiver may be for example a UE but it is not limited to UE type terminals, but may be any suitable radio receiver. The receiver receives multiple RF carriers (step S1), and initially calculates a power delay profile (PDP) for each serving cell and each neighboring cell (step S2). The receiver determines an association between at least one cell on the primary carrier and at least one cell on a secondary carrier based on the calculated PDPs (step S3). That association is then used in performing interference cancellation at the receiver (step S4).

Figure 7:
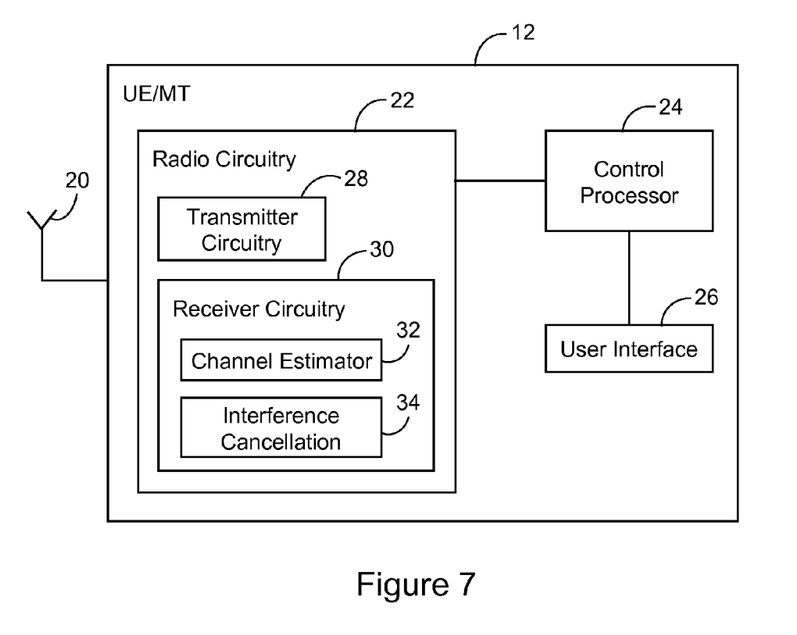
FIG. 7 is function block diagram illustrating a non-limiting example radio terminal.

FIG. 7 is function block diagram illustrating a non-limiting example multi-carrier radio terminal UE 12. The UE 12 includes one or more antennas 20 for receiving and transmitting radio signals with another radio station like a base station in the example. A control processor 24 controls the overall operation of the UE 12 and is connected to user interface circuitry 26, transmitter circuitry 28, and receiver circuitry 30. The receiver circuitry 30 includes a channel estimator for estimating a multipath radio propagation channel and for determining among other things a power delay profile (PDP). The receiver circuitry 30 also includes interference cancellation circuitry 34 that receives the PDP calculations from the channel estimator 32 and uses them in performing interference cancellation, e.g., cancelling cell transmissions from neighboring sites.

Figure 8:
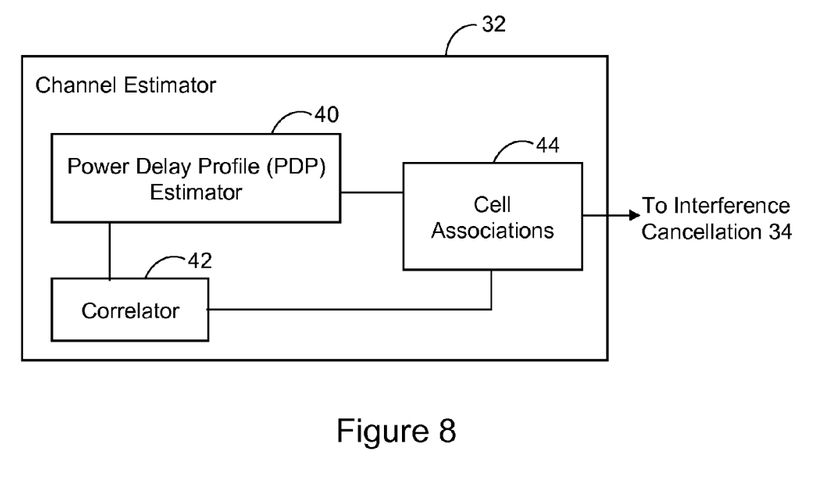
FIG. 8 is function block diagram illustrating a non-limiting example the non-limiting example radio terminal in FIG. 6.

The control processor, channel estimator, or interference cancellation circuitry includes functionality for determining cell/carrier associations in the neighboring sites and using those associations to simplify the PDP calculations used in the interference cancellation 34. FIG. 8 shows a function block diagram of an example channel estimator 32. It includes a power delay profile (PDP) estimator 40, a correlator 42, and a cell associations memory 44. The correlator 42 correlates the PDP(s) of one or more cells on the primary RF carrier with the PDPs of cells on the one or more secondary carriers. Those correlations are used to establish associations between cells very likely to be at the same site. Secondary cells having a strong correlation with a particular primary cell can be reasonably assumed to be associated with the same site and can use the same PDP as that calculated for that particular primary cell, thereby eliminating the need to calculate subsequent PDPs for those secondary cells at neighboring sites.

Interference cancellation circuitry 34 may optionally have different types of interference cancellation capabilities that may be dynamically or semi-statically selected by the control processor 24. For example, the interference cancellation circuitry 34 may include a more sophisticated and complex receiver type/configuration and a less sophisticated and complex receiver type/configuration. For illustration purposes, different receiver configurations are described in a WCDMA context. The 3GPP WCDMA release 5 UE receiver performance requirements are based solely on the baseline classical rake receiver, commonly specified as the minimum performance requirements in TS 25.101. In 3GPP WCDMA release 6 and beyond, enhanced UE receiver performance requirements are also specified in TS 25.101. In order to fulfill these enhanced requirements, the UE must implement an advanced receiver, e.g., with receiver diversity, a chip level equalizer, and generalized rake receivers (G-RAKE) or similar receiver structures. These enhancements boost the achievable downlink bit rate. In WCDMA terminology, UE receiver performance requirements for various advanced receivers are specified as enhanced receiver type 1 (receiver diversity), enhanced receiver type 2 (chip level equalizer), enhanced receiver type 3 (combined receiver diversity and equalizer), and type 3*i* (combined receiver diversity and inter-cell interference cancellation receiver). As mentioned in the background, different types of radio receivers have different levels of performance gain achieved by eliminating or at least mitigating different types of interference. There are various sources and forms of interference e.g. intra-cell, inter-cell, inter-stream interferences etc. For instance, in a CDMA system like WCDMA, intra-cell interference is common due to lack of orthogonality between the channelization codes as they pass through a multipath fading channel. On the other hand, inter-cell interference exists in single or tight reuse systems such as in CDMA and Orthogonal Frequency-Division Multiple Access (OFDMA)-based Long Term Evolution (LTE) system and is generated typically from a number of neighbor cells. Moreover, MIMO transmission uses two or more streams of data to achieve higher SINR. But multi-stream transmission also leads to inter-stream interference, which can be eliminated or considerably reduced by using an appropriate receiver.

The enhanced receiver type 3 (a.k.a G-RAKE 2 receiver in a symbol-level implementation) can eliminate intra-cell interference to attain a significant performance gain over the classical rake receiver. The enhanced receiver type 3*i* (a.k.a G-RAKE 2+ receiver in a symbol-level implementation) can eliminate both intra-cell and inter-cell interferences to attain significant performance gain over the classical rake receiver. There are several different ways to implement the type 3*i* receiver functionality. Two methods are referred to as parametric and non-parametric solutions. A non-parametric solution estimates the net interference effect, bundling intra-cell and inter-cell interference into one package, and tries to reduce them simultaneously. A parametric solution, on the other hand, attempts to model the interference into its different contributing parts. The parametric solution must detect a certain number of interfering cells to suppress (ideally the strongest interfering cells). For instance, the UE in a WCDMA system could identify the scrambling codes used in the strongest interfering cells and use this information to eliminate or minimize the interference.

The power delay profiles for each detected cell on the primary and secondary RF carrier frequencies may be detected and estimated using any suitable technique. Those skilled in the art understand that several PDP calculation techniques are known in the prior art, and therefore, are not described in detail here. Given that the power delay profiles of the different cells are known, the power profiles of each primary carrier is correlated with all of the secondary carriers (or at least the significant ones) and the correlation results are used to determine whether there is an association between any combination of the carriers.

The power delay profile for cell c is denoted as pdp(c), which is a vector of L elements, each element containing the power for a certain channel path from a base station to the UE. The relative delays associated with the elements in the pdp can either be uniformly spaced or according to some predetermined set of delays like for example the set of delays corresponding to the strongest paths. Let $p_{c,l}$ denote the power for the l:th detected path on the c:th cell. The power delay profile correlation between two power delay profiles originating from independent cells may be denoted pdp_corr(n, m), where n and m are power delay profiles. pdp_corr(n, m) can be calculated as follows:

$$\text{pdp\_corr}(n, m) = \frac{1}{\alpha} \sum_{l=1}^{L} p_{n,l} * p_{m,l}, \quad \text{(Eq. 1)}$$

where α is a scaling parameter that could be used to normalize the correlation output if needed.

The pdp_corr between cells on the primary carrier frequency and cells on the secondary carrier frequencies are determined in order to find associated cells. One example procedure to identify large correlation is now described. First, the correlation between each cell on the anchor frequency and each cell on the secondary frequencies is computed. The correlation result is denoted as $\text{corr}_{i,j,f}$, where i denotes the cell number on the primary frequency, j denotes the cell number on the secondary frequency, and f is an index denoting the specific secondary frequency. That is, if the set of cells that are transmitting on carrier frequency f is denoted $C_f$, where $C_1$ is the set of cells on the primary carrier frequency, $\text{corr}_{j,j,jf}$=pdp_corr(pdp(i), pdp(j)) is determined for all i contained in the set of $C_1$ and all j contained in the sets $C_2$ to $C_F$. Next, the correlation outputs are sorted in a list in descending order, the top entry of the list is identified, and an association between the carriers on the different frequencies for that top list entry is stored in memory 44. The top entry of the list is removed from the list, as are all entries in the list that correspond to correlations between the primary carrier frequency and the secondary frequency for which an association was recorded. This procedure continues until all cells on the primary frequency are recorded with an associated cell on each of the secondary frequencies. If the end of the list is reached before this completion point, the procedure may be performed again. Alternatively, the correlation results may be compared to a predetermined threshold, and if the result exceeds the threshold, an association is detected and stored.

Because the power delay profiles of associated cells are highly correlated, the multicarrier transmissions may hereafter be received and processed without the need for continuous power delay profile estimation or tracking on the secondary frequencies. Even if the association between the serving cells on the different frequencies can assumed to be known through higher layer signaling, as they are in the example in FIG. 5 (see the serving cell at site 1), the technology is nevertheless advantageous to improving the efficiency of the interference cancellation using the association discovered between interfering cells. If the interference cancellation involves identifying the strongest interfering cells and attempting to remove or mitigate the interference from these, the association between the interfering cells may be limited to finding the association between the strongest interfering cells on the primary carrier to further reduce processing required.

As the UE moves around in the network, the perceived strongest interfering cells may change. Accordingly, the association determination procedure may need to be performed at the initialization of the interference cancellation receiver as well as at later points in time, e.g., in response to one or more triggering criteria like a certain periodicity in time or when strongest interfering cells used in the interference cancellation change.

Returning to the example of FIG. 5, the UE may receive the primary carrier on $f_1$ which may identify cells $c_1$-$c_5$ as being cells on the primary RF carrier. As mentioned earlier, the associations between $f_2$-$c_6$, $f_3$-$c_{11}$, and $f_4$-$c_{16}$, may be previously known either because they are implied by the standard or via upper layer protocol signaling. The PDPs for all of the cells $c_1$-$c_{20}$ are initially calculated. Correlations are determined between the PDPs for cells $c_1$-$c_5$ on the primary carrier and the PDPs for all the other cells $c_6$-$c_{20}$ detected on secondary carriers. The correlation results are listed or compared to a threshold to determine high correlations that indicate cell associations. For example, high correlations and thus associations will be determined for $c_2$, $c_7$, $c_{12}$, and $c_{17}$; for $c_3$, $c_8$, $c_{13}$, and $c_{18}$; for $c_4$, $c_9$, $c_{14}$, and $c_{19}$; and for $c_5$, $c_{10}$, $c_{15}$, and $c_{20}$.

Figure 9:
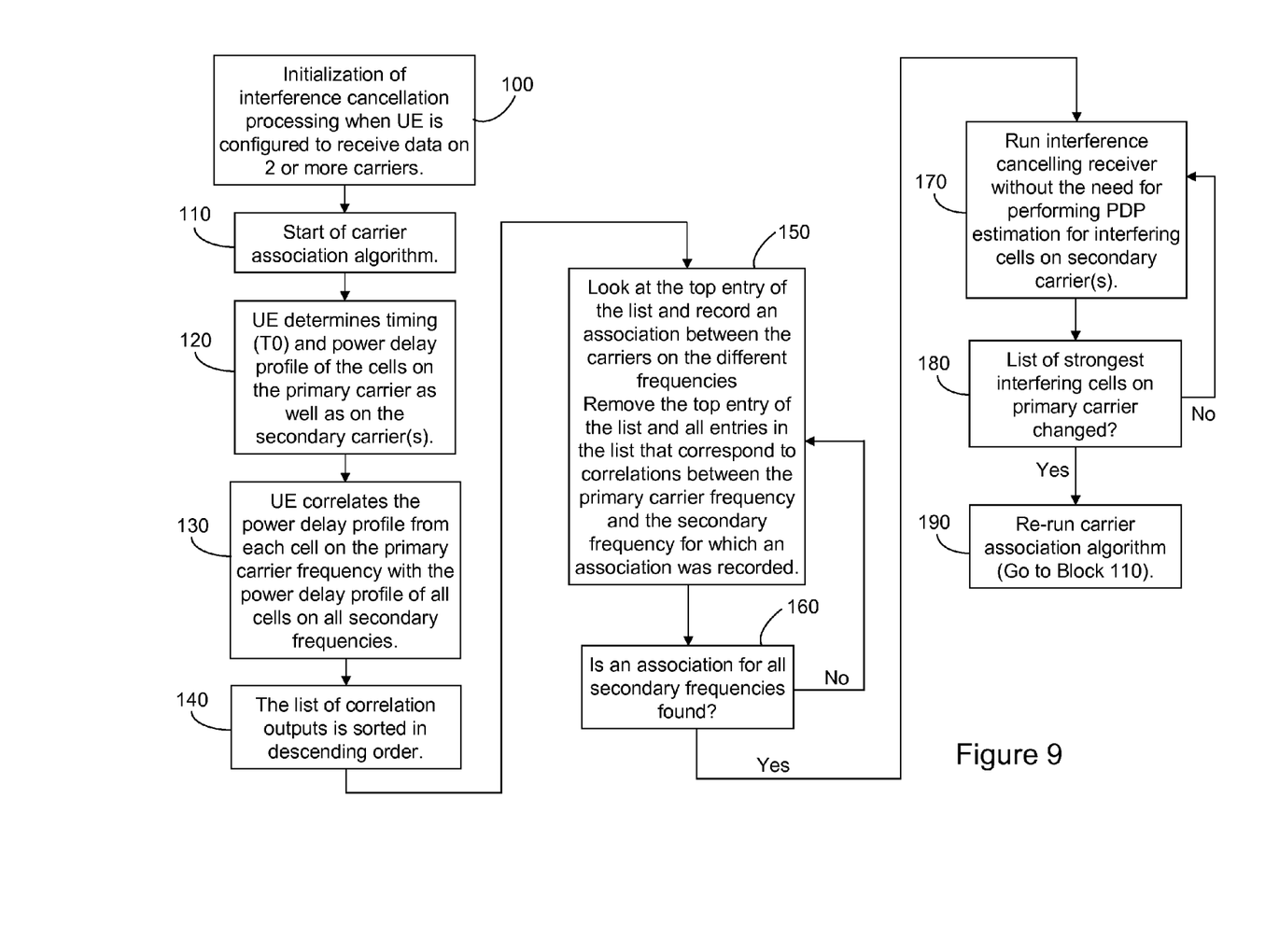
FIG. 9 is a flow chart illustrating example procedures in accordance with a non-limiting example for determining cell PDPs.

FIG. 9 is a flow chart illustrating example procedures for determining cell PDPs in a somewhat general non-limiting embodiment. Interference cancellation processing is initialized for a UE configured to receive multiple carrier (100) and the data processor-implemented, carrier association algorithm is started (110). The UE determines timing (T0) and power delay profile of cells on each of the primary and secondary carrier frequencies (120) by any suitable method (many are well known to the person skilled in the art). The UE correlates the power delay profile from each cell in the primary carrier frequency with the power delay profile of all cells on the secondary frequencies (130), and a list of correlation outputs is sorted in descending order (140). The top list entry in this example is identified and an association between the carriers on the different frequencies is recorded in memory (150). The top entry is removed from the list along with the list entries that correspond to correlations between the primary frequency and secondary frequency for each an association was recorded. If no association for all of the secondary frequencies is found (160), then control returns to 150. Otherwise, the interference cancellation is performed without having to calculate PDPs for interfering cells on secondary carrier(s) (170). A determination is preferably made, e.g., based on some trigger, whether the list of strongest interfering cells on the primary carrier has changed (180). If so, then the association algorithm is re-run (190) starting at 110.

The following sets the stage for non-limiting example UE implementations in WCDMA/HSPA. In single carrier WCDMA/HSPA, the downlink common control channels include a primary synchronization channel (P-SCH) which carries a primary synchronization code (PSC), a secondary synchronization channel (S-SCH), which carries a secondary synchronization code (SSC), a primary common pilot channel CPICH which carries scrambling code information, and a broadcast channel (BCH) which carries system information including a master information block (MIB) and one or more system information blocks (SIB). The P-SCH and S-SCH together are known as the SCH channel. LTE also uses common channels similar to those used in UTRAN/WCDMA/HSPA. Common channels in LTE include primary synchronization signals (PSS), secondary synchronization signals (SSS), reference signals (equivalent to pilot signals on the CPICH), and broadcast channel. The broadcast channel is split into physical broadcast channel (PBCH), which carries the MIB, and PDSCH, which carries SIBs.

In single carrier WCDMA, the P-SCH and S-SCH enable the UE to determine the slot and frame timing, as well as identify a limited set of primary scrambling codes containing the specific primary scrambling codes used by the cell from which the P-SCH and S-SCH are transmitted. The limited set is called the scrambling code group. The CPICH is used to pinpoint which of the primary scrambling codes contained in the scrambling code group indicated by P-SCH and S-SCH that is used by the cell being identified which indicates one of the 512 possible physical cell identities. There are a total of 8192 scrambling codes available for the system to use. This set is divided into 64 primary scrambling code groups, each group containing 8 primary scrambling codes. Each primary scrambling code is associated with 15 secondary scrambling codes through a one-to-one mapping. The UE does not need to search for secondary scrambling codes during the initial synchronization procedure. In the single carrier situation, the identification of slot/frame boundary and identification of scrambling code for the serving cell may be done through a staged approach. Stage 1: find the slot boundary using the P-SCH. Stage 2: find the frame boundary and the scrambling code group using P-SCH and S-SCH, where each scrambling code group contains 8 primary scrambling codes. Stage 3: using CPICH, determine the best primary scrambling code candidate out of the 8 contained in the scrambling code group identified in Stage 2.

For the UE receiver to cancel inter-cell interference caused by the neighbor cells, the channel impulse responses from each of the interfering cells must be determined, which means in a WCDMA system that the UE needs to know about the timing of the neighbor cells and the scrambling codes used in those neighbor cells. In a multi-carrier WCDMA system, the primary carrier contains all the common channels. However, depending upon the system implementation, some of the common control channels may not be transmitted on the secondary carriers; it might for example be the case that only the CPICH is transmitted on the secondary carrier to assist the UE for the demodulation of data received from the secondary carrier. The absence of SCH channels on the secondary carrier increases the complexity of the inter-cell interference cancellation receiver because the UE cannot make use of the P-SCH and S-SCH to identify the slot timing, frame timing, and scrambling code group.

Figure 10:
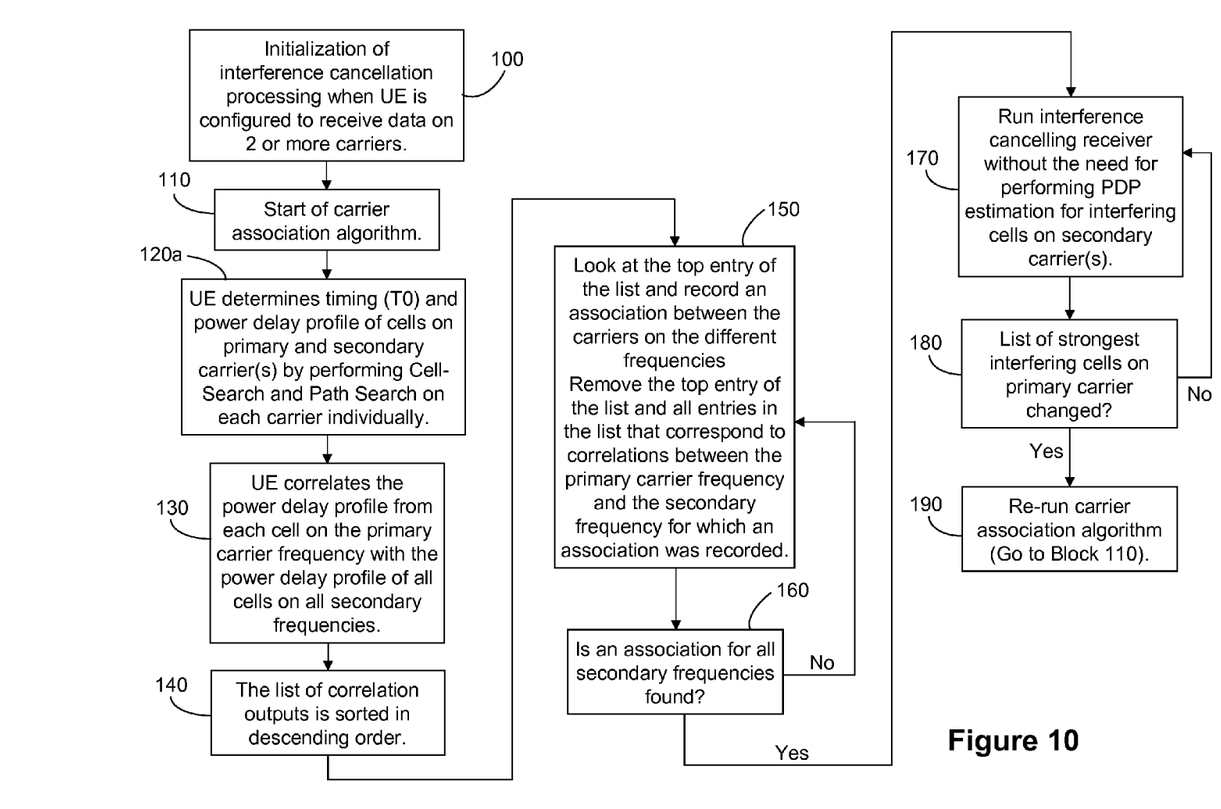
FIG. 10 is a flow chart illustrating example procedures in accordance with a first non-limiting example embodiment for determining cell PDPs.

FIG. 10 is a flow chart illustrating example procedures in accordance with a first non-limiting example embodiment for determining cell PDPs in a WCDMA system where the SCH is available on all carrier frequencies. Blocks 100, 110, 130-190 remain the same as for FIG. 9. In block 120b, the UE determines timing (T0) and a power delay of cells on the primary carrier by (a) performing a cell search on the primary carrier and making use of the SCH channel on the primary carrier and secondary carrier(s), and (b) performing a path search on each of the cells found on the primary and secondary carrier(s) making use of the timing and scrambling code information in the SCH channel and the CPICH to estimate power delay profiles for each of the cells on the primary carrier.

Figure 11:
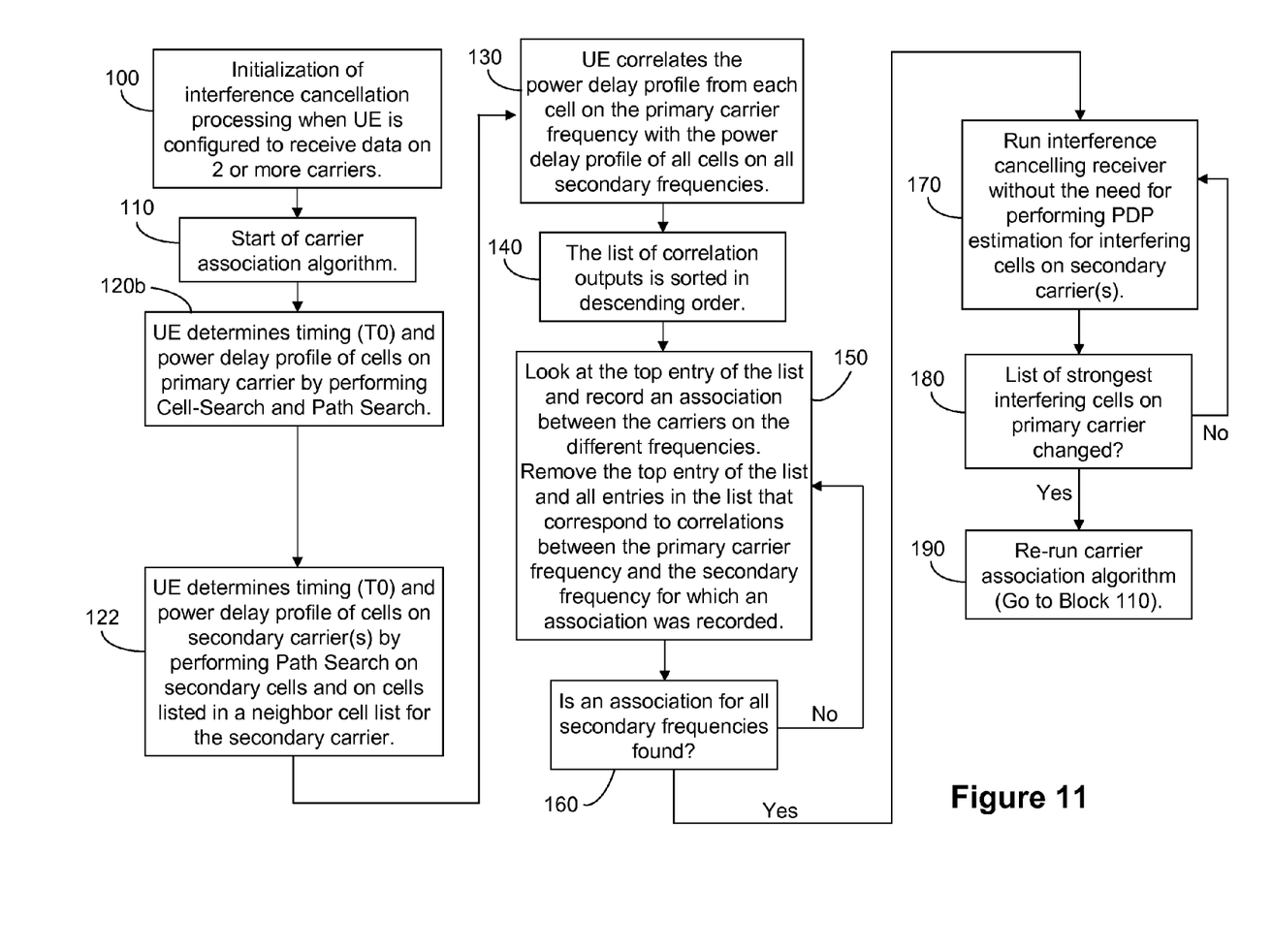
FIG. 11 is a flow chart illustrating example procedures in accordance with a second non-limiting example embodiment for determining cell PDPs.

FIG. 11 is a flow chart illustrating example procedures in accordance with a second non-limiting example embodiment for determining cell PDPs in a WCDMA system. This example embodiment operates under an assumption that SCH is not available on the secondary carrier frequencies, and that neighbor cell lists for all secondary carrier frequencies have been made available to the UE. Blocks 100, 110, 130-190 remain the same as for FIG. 9. In block 120b, the UE determines timing (T0) and a power delay of cells on the primary carrier by performing (a) a cell search on the primary carrier and making use of the SCH channel on the primary carrier, and (b) performing a path search on each of the cells found on the primary carrier making use of the timing and scrambling code information in the SCH channel and the CPICH to estimate power delay profiles for each of the cells on the primary carrier. In block 122, the UE determines timing (T0) and a power delay of cells on the secondary carrier(s) by performing a path search on the serving cells on the secondary carrier(s) and on cells listed a neighbor cell list for the secondary carrier(s). The path search makes use of the timing and scrambling code information in the SCH channel discovered in 120b and the CPICH to estimate power delay profiles for each of the cells on the secondary carrier.

Figure 12:
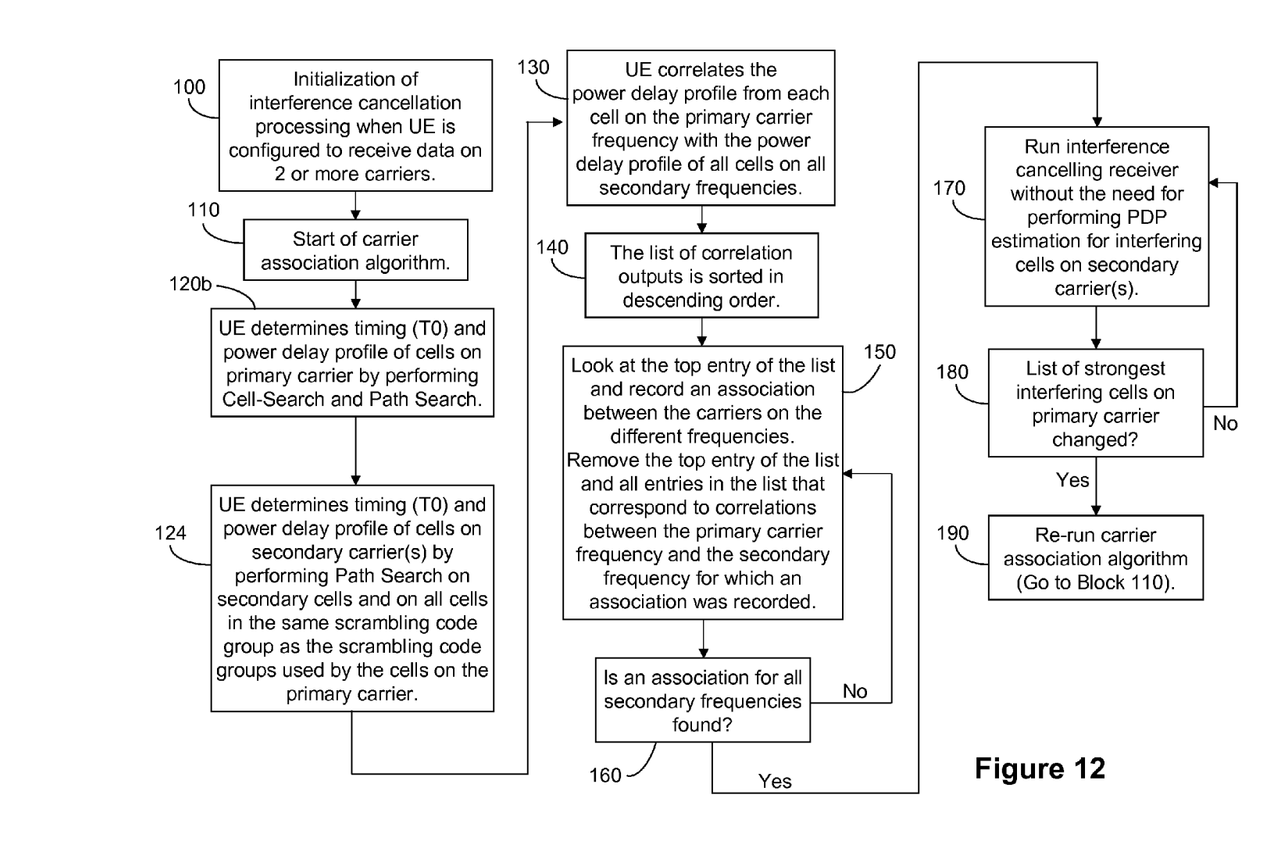
FIG. 12 is a flow chart illustrating example procedures in accordance with a third non-limiting example embodiment for determining cell PDPs.

FIG. 12 is a flow chart illustrating example procedures in accordance with a third non-limiting example embodiment in a WCDMA system for determining cell PDPs. This example embodiment operates under the same assumptions as that in FIG. 11. Blocks 100, 110, 120b, 130-190 remain the same as for FIG. 11. Instead of block 122, in block 124 the UE determines timing (T0) and a power delay of cells on the secondary carrier(s) by performing a path search on the serving cells on the secondary carrier(s) and on cells in the same scrambling code group as the scrambling code groups used by the cells on the primary carrier. This approach is useful if it is predetermined that cells on secondary carriers are restricted to using scrambling codes from the same scrambling code group as the primary carrier cell transmitting from the same geographical location.

The technology described allows a radio receiver in a multi-carrier system to effectively and efficiently cancel interference from neighboring cells even when cells on secondary carrier(s) do not transmit SCH type information. Interference cancellation processing resources are reduced because the need to calculate the power delay profile for each cell on the secondary carriers that the radio receiver receives on a continuing basis is eliminated. Based the recognition that power delay profiles on adjacent carriers in a multi-carrier system will be similar if transmitted from the same site, the technology determines an association between cells belonging to the same site which eliminates the need to estimate the power delay profile independently for each cell on each secondary carrier. Those associations mean that only the PDPs for the cells on the primary carrier need to be calculated on a continuing basis and those calculated PDPs can be used for associated secondary cells by the interference cancellation circuitry in the receiver. Because the carrier frequencies at a site are not spaced significantly far apart, further power delay profile estimation only needs to be done on one of the cells in the set of cells that have been determined to be co-located. This reduces the calculation load associated with the PDP estimation.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the claims and their equivalents. All structural and functional equivalents to the elements of the above-described preferred embodiment that are known to those of ordinary skill in the art are intended to be encompassed by the present claims. Moreover, it is not necessary for a device or method to address each and every problem sought to be solved by the technology described, for it to be encompassed by the present claims. Furthermore, no embodiment, feature, component, or step in this specification is intended to be dedicated to the public regardless of whether the embodiment, feature, component, or step is recited in the claims.

The invention claimed is:

1. A method for receiving multiple radio frequency (RF) carriers including a primary carrier and a secondary carrier in a radio node wherein each of the multiple RF carriers corresponds to a logical entity or object used in multi-carrier communications called a cell, where the cell is associated with a geographical location and transmission of a signal on a frequency, such that the receiving radio node receives signals on serving cells, including a first one of the serving cells on the primary carrier and a second one of the serving cells on the secondary carrier, and on neighboring cells, including a first one of the neighboring cells on the primary carrier and a second one of the neighboring cells on the secondary carrier, the method comprising:
  initially calculating a power delay profile for each of the serving cells and the neighboring cells;
  determining an association between at least one of the neighboring cells on the primary carrier and at least one of the neighboring cells on the secondary carrier based on the calculated power delay profiles, wherein the determined association used in performing interference cancellation is that the at least one neighboring cell on the primary carrier originates from a same geographical site as the at least one neighboring cell on the secondary carrier; and
  using the association in performing interference cancellation at the radio node; and
  later calculating, after initially calculating the power delay profile for each of the serving cells and the neighboring cells, a power delay profile for the at least one cell on the primary carrier;
  wherein using the association in performing interference cancellation at the radio node comprises using the power delay profile calculated later for the at least one cell on the primary carrier as the power delay profile for the associated at least one cell on the secondary carrier.

2. The method of claim 1, wherein each of the cells is associated with a geographical location as well as a transmission of a signal over an RF carrier, the serving cells being associated with a serving geographical location and the neighboring cells being associated with a neighboring geographical location that is different from the serving geographical location.

3. The method of claim 1, wherein the association is determined by correlating an initially calculated power delay profile for each of the cells on the primary carrier with an initially calculated power delay profile for each of the cells on the secondary carrier and by determining which correlations exceed a predetermined threshold; and
  wherein associated cells have a correlation that exceeds the predetermined threshold.

4. The method of claim 1, wherein multiple ones of the cells are associated with a transmission of a signal over the primary RF carrier and multiple ones of the cells are associated with a transmission of a signal over multiple secondary RF carriers, the method further comprising:
  initially calculating a power delay profile for each of the multiple ones of the cells on the primary RF carrier and for each of the multiple ones of the cells on the multiple secondary RF carriers,
  determining associations between one of the cells on the primary RF carrier and the multiple ones of the cells on the secondary RF carrier based on the initially calculated power delay profiles; and
  using the determined associations in performing interference cancellation at the radio node.

5. The method of claim 4, wherein the multiple ones of the cells on the secondary RF carriers are interfering cells whose associated signal transmissions are to be canceled by the interference cancellation.

6. The method of claim 4, further comprising:
  later calculating a power delay profile for each of the multiple ones of the cells on the primary RF carrier; and
  wherein using the determined associations comprises using the later calculated power delay profile for each one of the cells on the primary RF carrier as the power delay profile for the associated multiple cells on the secondary RF carrier.

7. The method of claim 5, wherein the associations between one of the cells on the primary RF carrier and the multiple cells on the secondary RF carrier based on the initially calculated power delay profiles are determined by correlating the initially calculated power delay profile for each one of the cells on the primary RF carrier with the initially calculated power delay profile for each one of the cells on the secondary RF carriers and by determining which correlation results exceed a predetermined threshold; and
  wherein associated cells have a correlation result that exceeds the predetermined threshold.

8. The method of claim 5, further comprising:
  correlating the initially calculated power delay profile for each one of the cells on the primary RF carrier with the initially calculated power delay profile for each one of the cells on the secondary RF carriers;
  listing interfering cells in order of correlation magnitude; and
  determining associations between one of the cells on the primary RF carrier and the multiple ones of the cells on the secondary RF carrier based on the listing.

9. The method of claim 8, further comprising, when the listing of interfering cells changes, repeating the operations of:
  initially calculating the power delay profile for each of the multiple cells;
  determining associations between the cell on the primary RF carrier;
  using the determined associations; and
  later calculating the power delay profile.

10. Apparatus for use in a radio node to receive multiple radio frequency (RF) carriers including a primary carrier and a secondary carrier, comprising:
  receiver circuitry configured to receive the multiple RF carriers, each of the multiple RF carriers corresponding to a logical entity or object used in multi-carrier communications called a cell, where the cell is associated with a geographical location and transmission of a signal on a frequency, such that the receiving node receives signals on serving cells, including a first one of the serving cells on the primary carrier and a second one of the serving cells on the secondary carrier, and on neighbor cells, including a first one of the neighboring cells on the primary carrier and a second one of the neighboring cells on the secondary carrier;

electronic circuitry configured to:
initially calculate a power delay profile for each of the serving cells and the neighboring cells,
determine an association between at least one of the neighboring cells on the primary carrier and at least one of the neighboring cells on the secondary carrier based on the calculated power delay profiles, wherein the determined association used in performing interference cancellation is that the at least one neighboring cell on the primary carrier originates from a same geographical site as the at least one neighboring cell on the secondary carrier;
use the association in performing interference cancellation at the radio node;
later calculate, after initially calculating the power delay profile for each of the serving cells and the neighboring cells a power delay profile for the at least one cell on the primary carrier; and
use the power delay profile calculated later for the at least one cell on the primary carrier as the power delay profile for the associated at least one cell on the secondary carrier.

11. The apparatus of claim 10, wherein each of the cells is associated with a geographical location as well as a transmission of a signal over an RF carrier, the serving cells being associated with a serving geographical location and the neighboring cells being associated with a neighboring geographical location that is different from the serving geographical location.

12. The apparatus of claim 10, wherein the association is determined by correlating an initially calculated power delay profile for each of the cells on the primary carrier with an initially calculated power delay profile for each of the cells on the secondary carrier and by determining which correlations exceed a predetermined threshold; and
wherein associated cells have a correlation that exceeds the predetermined threshold.

13. The apparatus of claim 10, wherein multiple ones of the cells are associated with a transmission of a signal over the primary RF carrier and multiple ones of the cells are associated with a transmission of a signal over multiple secondary RF carriers, wherein the electronic circuitry is further configured to:
initially calculate a power delay profile for each of the multiple ones of the cells on the primary RF carrier and for each of the multiple ones of the cells on the multiple secondary RF carriers,
determine associations between one of the cells on the primary RF carrier and the multiple ones of the cells on the secondary RF carrier based on the initially calculated power delay profiles, and
use the determined associations in performing interference cancellation at the radio node.

14. The apparatus of claim 13, wherein the multiple ones of the cells on the secondary RF carriers are interfering cells whose associated signal transmissions are to be canceled by the interference cancellation.

15. The apparatus of claim 13, wherein the electronic circuitry is further configured to:
later calculate a power delay profile for each of the multiple ones of the cells on the primary RF carrier; and
use the determined associations by using the later calculated power delay profile for each one of the cells on the primary RF carrier as the power delay profile for the associated multiple cells on the secondary RF carrier.

16. The apparatus of claim 15, wherein the electronic circuitry is further configured to:
determine the associations between one of the cells on the primary RF carrier and the multiple cells on the secondary RF carrier based on the initially calculated power delay profiles by correlating the initially calculated power delay profile for each one of the cells on the primary RF carrier with the initially calculated power delay profile for each one of the cells on the secondary RF carriers; and
determine which correlation results exceed a predetermined threshold;
wherein associated cells have a correlation result that exceeds the predetermined threshold.

17. The apparatus of claim 15, wherein the electronic circuitry is further configured to:
correlate the initially calculated power delay profile for each one of the cells on the primary RF carrier with the initially calculated power delay profile for each one of the cells on the secondary RF carriers;
list interfering cells in order of correlation magnitude; and
determine associations between one of the cells on the primary RF carrier and the multiple ones of the cells on the secondary RF carrier based on the listing.

18. The apparatus of claim 15, wherein the electronic circuitry is further configured to, when the listing of interfering cells changes, repeat the operations of:
initially calculating the power delay profile for each of the multiple cells;
determining associations between the cell on the primary RF carrier;
using the determined associations; and
later calculating the power delay profile.

* * * * *